US011068289B2

(12) United States Patent
Ohkawa et al.

(10) Patent No.: US 11,068,289 B2
(45) Date of Patent: Jul. 20, 2021

(54) INSTALLATION ASSIST APPARATUS, INSTALLATION ASSIST METHOD, AND COMPUTER PROGRAM PRODUCT

(71) Applicant: TAIYO YUDEN CO., LTD., Tokyo (JP)

(72) Inventors: Hideki Ohkawa, Tokyo (JP); Ryuichi Sunagawa, Tokyo (JP); Hiroya Kakimoto, Tokyo (JP); Masayuki Tsuda, Tokyo (JP); Izumi Igawa, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 16/831,694

(22) Filed: Mar. 26, 2020

(65) Prior Publication Data
US 2020/0310843 A1    Oct. 1, 2020

(30) Foreign Application Priority Data
Mar. 29, 2019  (JP) .............................. JP2019-068804

(51) Int. Cl.
*G06F 3/048* (2013.01)
*G06F 9/451* (2018.01)
*G06F 16/29* (2019.01)

(52) U.S. Cl.
CPC .............. *G06F 9/453* (2018.02); *G06F 16/29* (2019.01)

(58) Field of Classification Search
CPC .................................. G06F 9/453; G06F 16/29
See application file for complete search history.

(56) References Cited

U.S. PATENT DOCUMENTS

| | | | |
|---|---|---|---|
| 9,329,309 B2* | 5/2016 | Van Heugten | G02B 5/1876 |
| 9,600,983 B1* | 3/2017 | Lydecker | H05B 45/20 |
| 10,462,014 B1* | 10/2019 | Wang | H04Q 11/0067 |
| 10,666,521 B1* | 5/2020 | Wang | H04W 16/26 |
| 10,732,656 B2* | 8/2020 | Tyler | H02J 3/28 |
| 2010/0076835 A1* | 3/2010 | Silverman | G06Q 30/02 705/14.33 |
| 2016/0380351 A1* | 12/2016 | Simmonds | H01Q 3/08 342/359 |
| 2017/0192416 A1* | 7/2017 | Bechstedt | G05B 23/0272 |

(Continued)

FOREIGN PATENT DOCUMENTS

JP     2007-304696 A     11/2007

*Primary Examiner* — David Phantana-angkool
(74) *Attorney, Agent, or Firm* — Chen Yoshimura LLP

(57) ABSTRACT

An installation assist apparatus according to an embodiment of the present disclosure includes hardware processor configured to: receive an input of installation positions of first and second optical wireless communication devices performing optical wireless communication and an input of an angle of elevation representing an inclination of an optical axis center line to a horizontal line, the optical axis center line connecting the first and second optical wireless communication devices; determine whether each of the first and second optical wireless communication devices is affected by solar light, the determination being carried out based on the installation positions of the devices, the angle of elevation, an influence angle representing a maximum value of an incident angle of solar light affecting the devices, and solar positions through a whole year; and cause a display device to display a result of the determination.

9 Claims, 12 Drawing Sheets

(56) References Cited

U.S. PATENT DOCUMENTS

| | | | |
|---|---|---|---|
| 2018/0052478 A1* | 2/2018 | Varma | H02J 3/1842 |
| 2020/0166340 A1* | 5/2020 | Hinderling | F16M 11/125 |
| 2020/0310843 A1* | 10/2020 | Ohkawa | H04B 10/671 |
| 2020/0341113 A1* | 10/2020 | Shen | G01S 7/4021 |

* cited by examiner

INSTALLATION ASSIST APPARATUS, INSTALLATION ASSIST METHOD, AND COMPUTER PROGRAM PRODUCT

CROSS-REFERENCE TO RELATED APPLICATIONS

This application is based upon and claims the benefit of priority from Japanese Patent Application No. 2019-068804, filed Mar. 29, 2019, the entire contents of which are incorporated herein by reference.

FIELD

Embodiments described herein relate to an installation assist apparatus, an installation assist method, and a computer program product.

BACKGROUND

An optical wireless communication system, in which bi-directional communication is performed by using light between a pair of optical wireless communication devices installed face-to-face with each other, have been known. In such an optical wireless communication system, when one of the optical wireless communication devices emits light modulated by on-off keying in accordance with a signal to be transmitted, the light is spatially transmitted and received by the other optical wireless communication device and is restored to the original signal. When the other optical wireless communication device emits light modulated by on-off keying in accordance with a signal to be transmitted, the light is spatially transmitted and received by the one of the optical wireless communication devices and is restored to the original signal.

When optical wireless communication devices are installed outdoors, it is necessary to consider appropriate installation positions in consideration of the influence of solar light because stable communication may be hindered by that solar light enters the optical wireless communication device. However, conventionally, a worker who installs an optical wireless communication device sensuously determines the influence of solar light. Thus, there is a case where, a communication failure is found due to the influence of solar light after the optical wireless communication device is actually installed and operated, and ex-post measures need to be taken. Therefore, it is desired that the influence of solar light be quantitatively determined in installing an optical wireless communication device.

Japanese Patent Application Laid-open No. 2007-304696 discloses a technology for suppressing functional deterioration of optical wireless communication by decreasing reception sensitivity of a light receiving unit and increasing light emission power of a light emitting unit when it is determined that there is influence of solar light during vehicle-to-vehicle communication using light. However, there has not been a method for quantitatively determining the influence of solar light when fixedly installing an optical wireless communication device outdoors.

SUMMARY

An installation assist apparatus according to an embodiment of the present disclosure includes a memory and a hardware processor coupled to the memory. The hardware processor is configured to: receive: an input of installation positions of a first optical wireless communication device and a second optical wireless communication device that perform optical wireless communication; and an input of an angle of elevation representing an inclination of an optical axis center line to a horizontal line, the optical axis center line connecting the first and second optical wireless communication devices; determine whether each of the first and second optical wireless communication devices is affected by solar light, the determination being carried out based on the installation positions of the first and second optical wireless communication devices, the angle of elevation, an influence angle representing a maximum value of an incident angle of solar light affecting the optical wireless communication devices, and solar positions through a whole year; and cause a display device to display a result of the determination on whether each of the first and second optical wireless communication devices is affected by solar light.

DETAILED DESCRIPTION

Referring to the accompanying drawings, an installation assist apparatus, an installation assist method, and a computer program product for an optical wireless communication device in an embodiment are described below. The present embodiment is directed to assist of the installation of a pair of optical wireless communication devices which perform bi-directional communication using light, and more particularly, enables a quantitative determination on the influence of solar light when installing the optical wireless communication devices.

Figure 1:
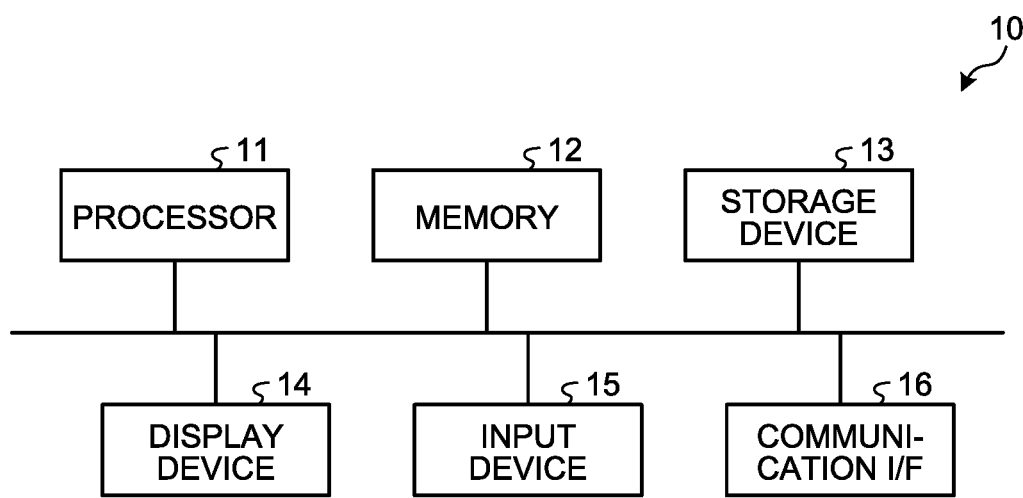
FIG. 1 is a block diagram illustrating an example of a hardware configuration of an installation assist apparatus according to an embodiment.

FIG. 1 is a block diagram illustrating an example of a hardware configuration of an installation assist apparatus 10 in the present embodiment. The installation assist apparatus 10 in the present embodiment can be implemented by using a terminal device having a hardware configuration as a general computer system including, for example, as illustrated in FIG. 1, a processor 11 such as a central processing unit (CPU), a memory 12 such as a random access memory (RAM) and a read only memory (ROM), a storage device 13 such as a hard disk drive (HDD) and a solid state drive (SSD), a display device 14 such as a liquid crystal display, an input device 15 such as a touch panel, a mouse, and a keyboard, and a communication I/F 16 configured to communicate with the outside of the device.

Examples of such a terminal device include a smartphone, a tablet terminal, a notebook personal computer (PC), and a desktop PC. The installation assist apparatus 10 in the present embodiment is implemented by collaboration of hardware of the terminal device and software. Although the following assumes to use the smartphone as hardware of the installation assist apparatus 10 in the present embodiment, other terminal devices such as a tablet terminal, a notebook PC, and a desktop PC may be used.

Figure 2:
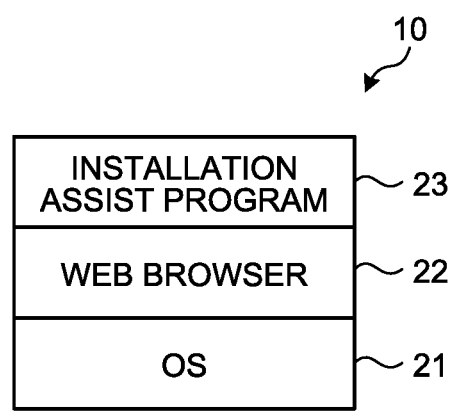
FIG. 2 is a diagram illustrating an example of layered structure of software for implementing the installation assist apparatus according to the embodiment.

FIG. 2 is a diagram illustrating an example of layered structure of software for implementing the installation assist apparatus 10 in the present embodiment. Functions of the installation assist apparatus 10 in the present embodiment are implemented by, for example, as illustrated in FIG. 2, executing an installation assist program 23 by using a function of a Web browser 22 running on an operating system (OS) 21. For example, the installation assist program 23 is written by JavaScript (registered trademark) and managed on a predetermined website. When the Web browser 22 accesses the website by using the communication I/F 16, the installation assist program 23 can be read in the installation assist apparatus 10 and executed on the Web browser 22. The installation assist program 23 may be developed as application software provided by an application providing site, and the installation assist apparatus 10 may download the installation assist program 23 from the application providing site by using the communication I/F 16, and install the installation assist program 23 in the storage device 13.

Figure 3:
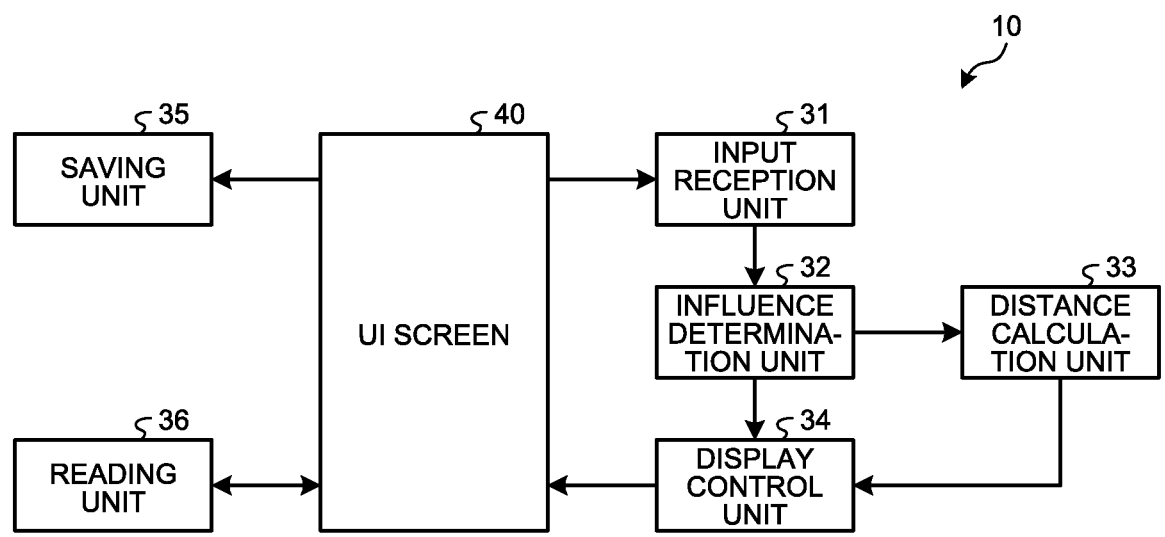
FIG. 3 is a block diagram illustrating an example of a functional configuration of the installation assist apparatus according to the embodiment.

FIG. 3 is a block diagram illustrating an example of a functional configuration of the installation assist apparatus 10 in the present embodiment. For example, the installation assist apparatus 10 in the present embodiment receives inputs from a user of the installation assist apparatus 10 through a user interface (UI) screen 40 provided by using the function of the Web browser 22, and shows various kinds of information to the user. The present embodiment is assumed to be applied to a smartphone, so that the UI screen 40 is displayed on, for example, a touch panel liquid crystal display in which the display device 14 and the input device 15 are integrated.

The installation assist apparatus 10 includes, as illustrated in FIG. 3, an input reception unit 31, an influence determination unit 32, a distance calculation unit 33, a display control unit 34, a saving unit 35, and a reading unit 36, each being a functional element implemented by the processor 11 that executes the installation assist program 23 while using the memory 12.

Figure 4:
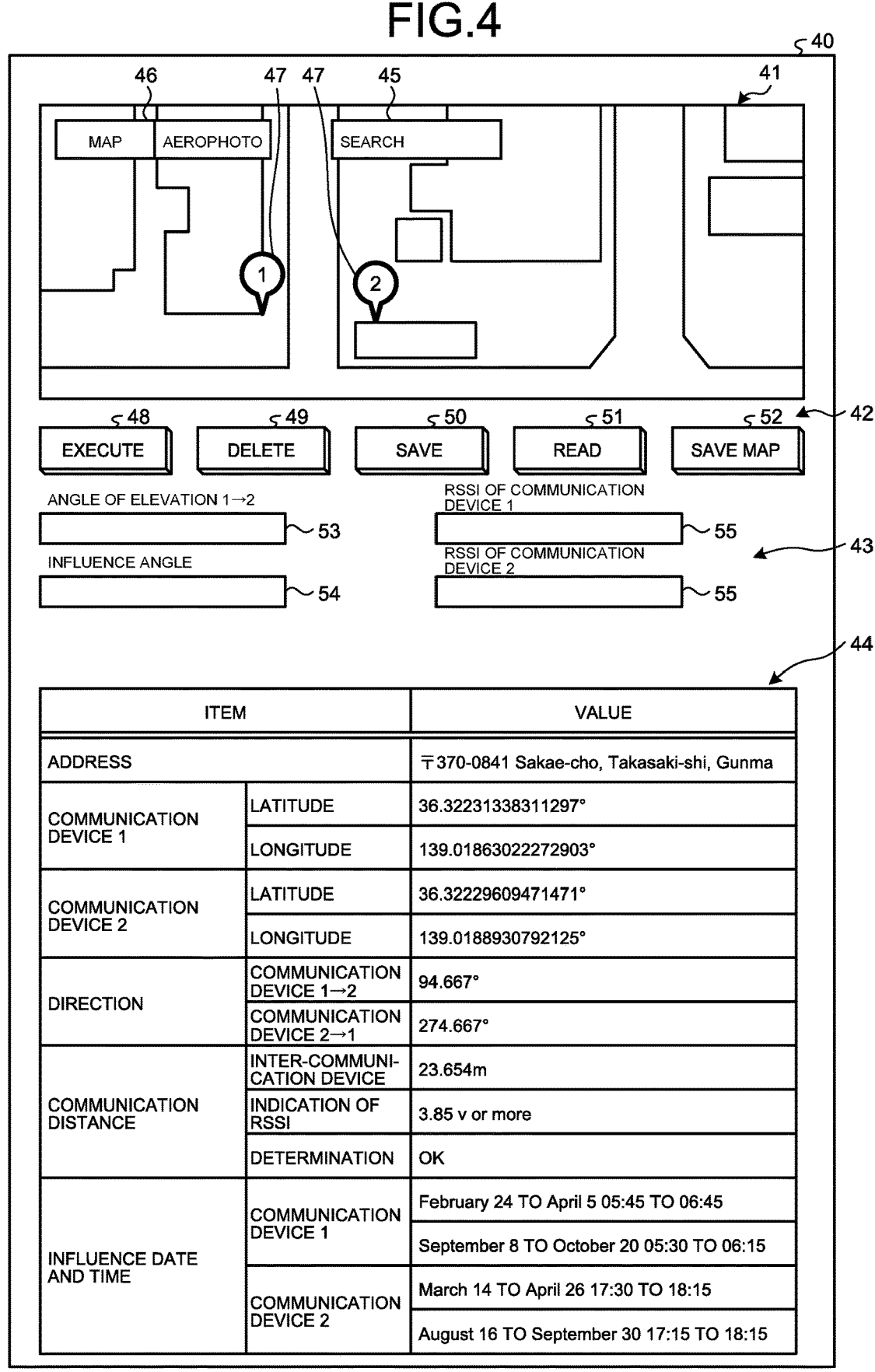
FIG. 4 is a diagram illustrating an example of a UI screen.

First, the UI screen 40 will be described. FIG. 4 is a diagram illustrating an example of the UI screen 40. The UI screen 40 is displayed on the display device 14 when the Web browser 22 executes the installation assist program 23. As illustrated in FIG. 4, the UI screen 40 includes a map display region 41, a button arrangement region 42, a user input region 43, and a result display region 44.

The map display region 41 is a region in which a map used for the user to designate (input) installation positions of a pair of optical wireless communication devices is displayed.

For example, the user can display a desired map in the map display region 41 by inputting desired keywords such as an address and a facility name into a "search" input box 45 in the map display region 41. For example, the map displayed in the map display region 41 is acquired from a predetermined map providing site. For example, the map displayed in the map display region 41 can be reduced or enlarged to a desired scale by pinch-in or pinch-out operation in the map display region 41. For example, the map displayed in the map display region 41 can be scrolled by swiping operation or flicking operation in the map display region 41. As in the example illustrated in FIG. 4, a "map/aerial photograph" button 46 may be provided in the map display region 41, and map display and photo display may be switched by the operation of the "map/aerial photograph" button 46.

The user is able to input the installation positions of a pair of optical wireless communication devices by sequentially designating, by tapping operation or the like, positions at which a pair of optical wireless communication devices are to be installed on a map displayed in the map display region 41. Out of the pair of optical wireless communication devices, an optical wireless communication device whose installation position is designated earlier is referred to as "communication device 1 (first optical wireless communication device)", and an optical wireless communication device whose installation position is designated next is referred to as "communication device 2 (second optical wireless communication device)". Markers 47 are superimposed on the installation positions of the communication device 1 and the communication device 2 designated on the map. The installation positions of the communication device 1 and the communication device 2 are distinguished by numeric values ("1" and "2") in the markers 47.

The button arrangement region 42 is a region in which buttons allowing the user to operate are arranged. For example, various kinds of buttons, such as an "execute" button 48, a "delete" button 49, a "save" button 50, a "read" button 51, and a "map save" button 52, are arranged in the button arrangement region 42.

The "execute" button 48 is a button operated to instruct the installation assist apparatus 10 to execute arithmetic operation. The "delete" button 49 is a button operated to disable the installation positions of the communication device 1 and the communication device 2 designated on the map. When the "delete" button 49 is operated, the markers 47 on the map are deleted.

The "save" button 50 is a button operated to save, as a data file, information displayed in the result display region 44. The "read" button 51 is a button operated to read information saved as the data file and display the information in the result display region 44. When information is displayed in the result display region 44 in response to the operation of the "read" button 51, a map, in which markers 47 are superimposed at the installation positions of the communication device 1 and the communication device 2 corresponding to the information, is restored in the map display region 41. The "map save" button 52 is a button operated to save, as a data file, a map displayed in the map display region 41. Various kinds of buttons arranged in the button arrangement region 42 can be operated by, for example, tapping operations on the display positions of the buttons.

The user input region 43 is a region used for the user to input numeric values. For example, the user input region 43 is provided with an "angle of elevation" input box 53 to input an angle of elevation described later and an "influence angle" input box 54 to input an influence angle described later. The user input region 43 is further provided with "RSSI" input boxes 55 in which received signal strength indicator (RSSI) indicating received signal strength of the communication device 1 and the communication device 2 is input as input boxes which are used after the installation of the communication device 1 and the communication device 2 is completed. The numeric values can be input to the input boxes by using, for example, a numeric keypad which appears on the screen when the display position of the input box is tapped.

The result display region 44 is a region in which various kinds of information including arithmetic results by the installation assist apparatus 10 are displayed. Each piece of information is displayed in the result display region 44 as a combination of an item and a corresponding value. For example, the address of an installation position of the communication device 1 (position at which marker 47 corresponding to communication device 1 is superimposed) designated on a map displayed in the map display region 41 is displayed as the value corresponding to the item "address". The latitude and longitude of the installation position of the communication device 1 designated on the map (position of marker 47 on map) are displayed as the values corresponding to the item "communication device 1", and the latitude and longitude of the installation position of the communication device 2 designated on the map (position of marker 47 on map) are displayed as the values corresponding to the item "communication device 2". A direction directed from the installation position of the communication device 1 toward the installation position of the communication device 2 and a direction directed from the installation position of the communication device 2 toward the installation position of the communication device 1 are displayed as the values corresponding to the item "direction".

A distance between the installation position of the communication device 1 and the installation position of the communication device 2, an indication of RSSI corresponding to the distance, and a determination result (OK/NG) representing whether or not the distance falls within the range of a predetermined appropriate communication distance are displayed as the values corresponding to the item "communication distance". Determination results representing whether the communication device 1 and the communication device 2 are affected by solar light are displayed as the values corresponding to the item "influence date and time". With regard to the determination result representing whether or not the communication device is affected by solar light, for example, a message of "no influence of solar light" is displayed when the determination result represents that the communication device is not affected by solar light, and a time zone in which the communication device is affected by solar light is displayed when the determination result represents that the communication device is affected by solar light.

In the installation assist apparatus 10 in the present embodiment, various kinds of arithmetic operation are performed by that the user uses the UI screen 40 to: designate (input) an installation position of the communication device 1 and an installation position of the communication device 2 on a map displayed in the map display region 41; input an angle of elevation in the "angle of elevation" input box 53 and an influence angle in the "influence angle" input box 54; and operates the "execute" button 48. Various kinds of information including the results of arithmetic operation are displayed in the result display region 44 on the UI screen 40.

The entire UI screen 40 can be reduced or enlarged to a desired size and displayed on the display device 14 by, for example, pinch-in or pinch-out operation outside the map display region 41. The UI screen 40 can be scrolled by, for example, swiping operation or flicking operation outside the map display region 41. In this manner, the UI screen 40 can be prevented from being difficult to view due to constraints of the display size of the display device 14.

Next, the functional units in the installation assist apparatus 10 illustrated in FIG. 3 will be described. The input reception unit 31 receives inputs from the user using the UI screen 40. Specifically, the input reception unit 31 receives an input of the installation positions of the communication device 1 and the communication device 2 in the map display region 41, and inputs of the angle of elevation and the influence angle in the user input region 43. Those inputs from the user received by the input reception unit 31 are transferred to the influence determination unit 32.

Figure 5:
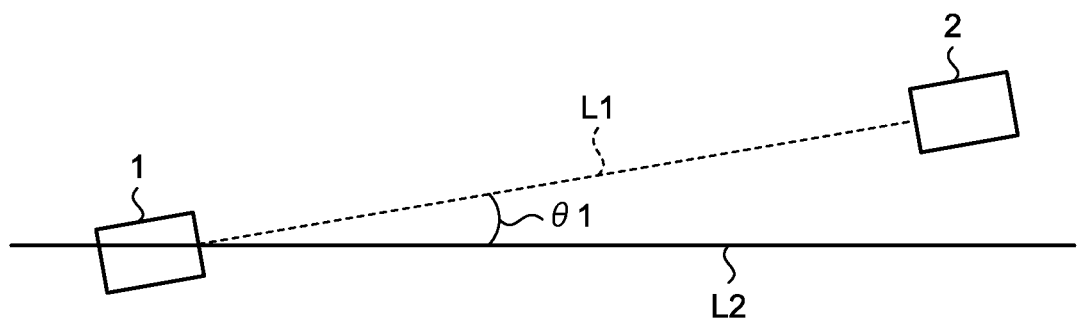
FIG. 5 is a diagram for describing an angle of elevation.

As illustrated in FIG. 5, the angle of elevation is an angle representing an inclination θ1 of an optical axis center line L1 connecting the communication devices 1 and 2 to a horizontal line L2. In other words, the angle of elevation corresponds to the altitude of the communication device 2 as seen from the communication device 1. When the communication device 2 is located at a position higher than the communication device 1, the angle of elevation takes a positive value. When the communication device 2 is located at a position lower than the communication device 1, the angle of elevation takes a negative value.

Figure 6:
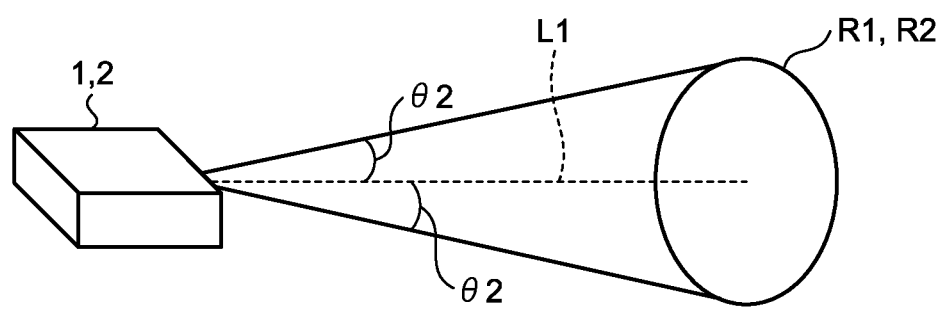
FIG. 6 is a diagram for describing an influence angle.

As illustrated in FIG. 6, the influence angle represents a maximum value θ2 of an incident angle (inclination of incident light to optical axis center line L1 of optical wireless communication device) of solar light that affects the optical wireless communication devices (communication device 1 and communication device 2). When the incident angle of solar light to the communication device 1 or the communication device 2 is equal to or smaller than the influence angle, it is determined that the communication device 1 or the communication device 2 is affected by solar light. When the incident angle of solar light to the communication device 1 or the communication device 2 is larger than the influence angle, it is determined that the communication device 1 or the communication device 2 is not affected by solar light. The present embodiment enables the user to input the influence angle in consideration that the influence angle differs depending on the structure of the optical wireless communication device, but the influence angle may be a fixed value, such as 10 degrees. In this case, since the user does not input the angle of elevation, the "influence angle" input box 54 on the UI screen 40 is unnecessary.

The influence determination unit 32 is activated in response to the operation of the "execute" button 48 by the user. The influence determination unit 32 then determines whether each of the communication devices 1 and 2 is affected by solar light, based on the installation positions of the communication devices 1 and 2, the angle of elevation, and the influence angle input by the user and solar positions through a whole year.

Figure 7:
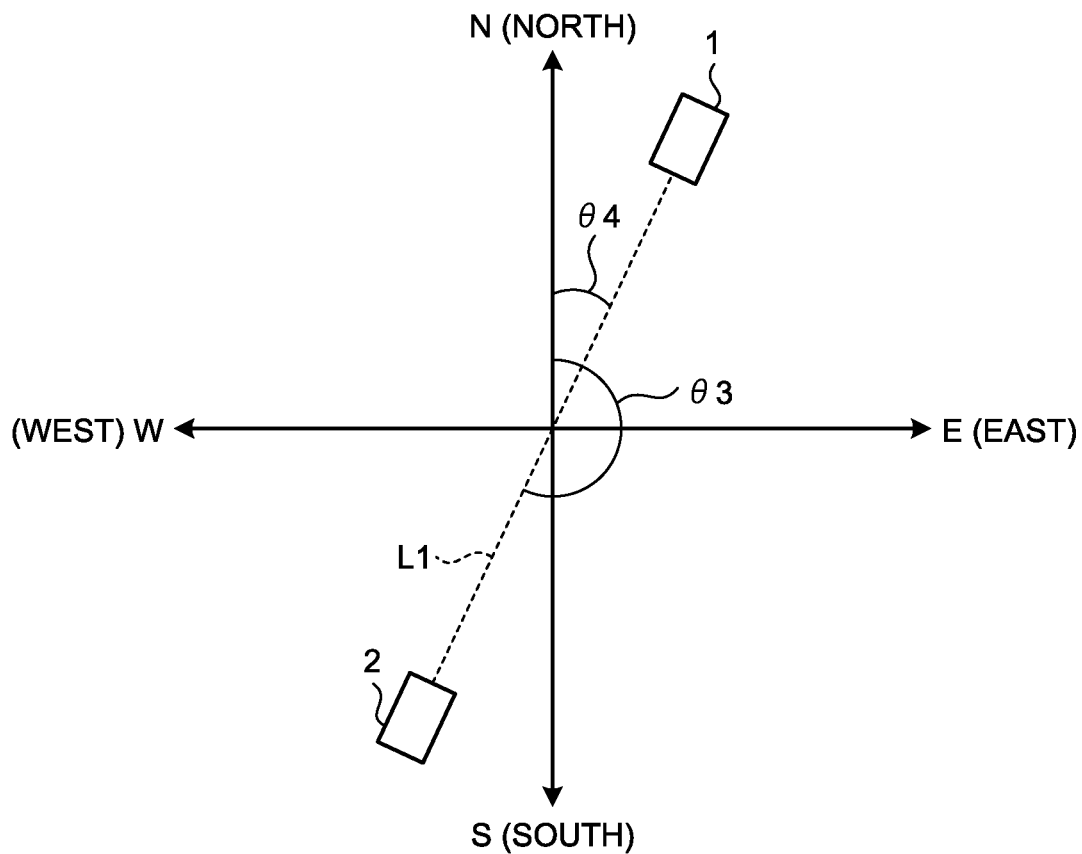
FIG. 7 is a diagram for describing a direction.

Specifically, first, the influence determination unit 32 extracts the latitudes and longitudes of the installation positions of the communication device 1 and the communication device 2 input by the user. The influence determination unit 32 calculates a direction directed from the installation position of the communication device 1 toward the installation position of the communication device 2 and a direction directed from the installation position of the communication device 2 toward the installation position of the communication device 1, based on the latitude and longitude of the installation position of the communication device 1 and the latitude and longitude of the installation position of the communication device 2. The direction directed from the installation position of the communication device 1 toward the installation position of the communication device 2 is represented by an azimuth of the communication device 2 (an angle θ3 shown in FIG. 7). The direction directed from the installation position of the communication device 2 toward the installation position of the communication device 1 is represented by an azimuth of the communication device 1 (an angle θ4 shown in FIG. 7).

Next, the influence determination unit 32 calculates a range of influence R1 of the communication device 1 based on the direction directed from the installation position of the communication device 1 toward the installation position of the communication device 2, the angle of elevation, and the influence angle. The influence determination unit 32 calculates a range of influence R2 of the communication device 2 based on the direction directed from the installation position of the communication device 2 toward the installation position of the communication device 1, the angle of elevation, and the influence angle. As illustrated in FIG. 6, the range of influence R1 or R2 of the communication device 1 or 2 is a region of a circle obtained by projecting the range of the influence angle from the optical axis center line L1 of the communication device 1 or 2 on a plane perpendicular to the optical axis center line L1 of the communication device 1 or 2.

Figure 9:
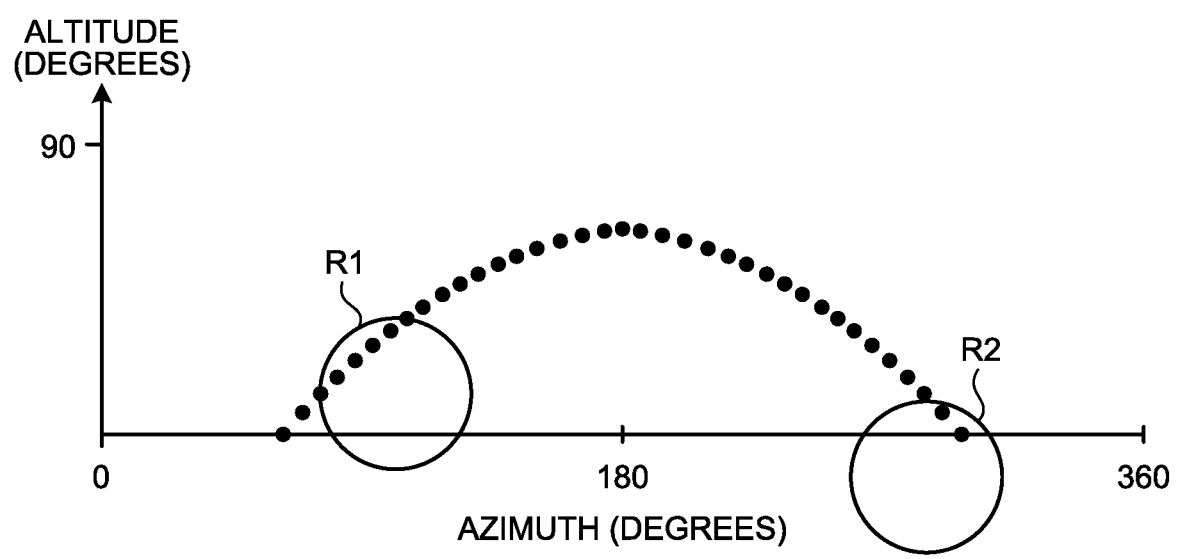
FIG. 9 is a diagram for describing an example of a method for determining whether communication devices are affected by solar light.

As illustrated in FIG. 9, the range of influence R1 of the communication device 1 can be regarded as a circle that is centered at a coordinate point whose value of x is the direction directed from the installation position of the communication device 1 toward the installation position of the communication device 2 and whose value of y is the angle of elevation on two-dimensional coordinates whose X axis is the azimuth (expressed in degree) and Y axis is the altitude (expressed in degree) and which has a radius corresponding to the influence angle. Similarly, the range of influence R2 of the communication device 2 can be regarded as a circle that is centered at a coordinate point whose value of x is the direction directed from the installation position of the communication device 2 toward the installation position of the communication device 1 and whose value of y is the angle of elevation on two-dimensional coordinates whose X axis is the range of influence R1 of the communication device 1 and the azimuth (degree) and Y axis is the altitude (degree) and which has a radius corresponding to the influence angle.

When the range of influence R1 of the communication device 1 and the range of influence R2 of the communication device 2 are calculated, the influence determination unit 32 sequentially calculates solar positions with respect to the installation position of the communication device 1 and the installation position of the communication device 2 at predetermined time intervals, such as 15-minute intervals, through a whole year (that is, 365 days). When a solar position enters the range of influence R1 of the communication device 1, the influence determination unit 32 determines that the communication device 1 is affected by solar light. When a solar position enters the range of influence R2 of the communication device 2, the influence determination unit 32 determines that the communication device 2 is affected by solar light.

Figure 8:
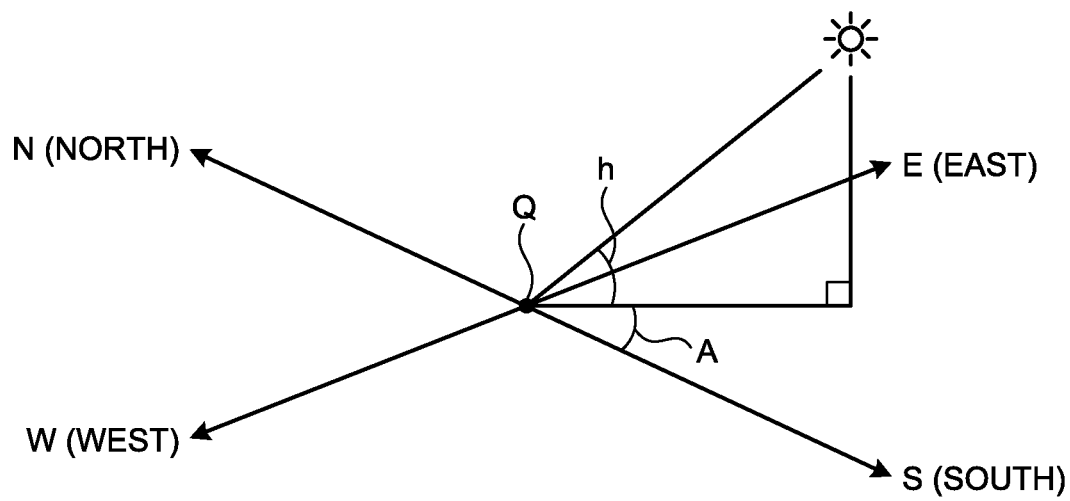
FIG. 8 is a diagram for describing a solar position.

A solar position represents the position of the sun at a given time at a given point (observation point), and is determined by a solar altitude h and a solar azimuth angle A. As illustrated in FIG. 8, the solar altitude h is defined as an angle (angle of elevation) formed by a straight line connecting a given observation point Q and the sun, and a projection line obtained by projecting the straight line onto the ground. The solar azimuth angle A is defined as an angle formed by: a projection line obtained by projecting a straight line connecting a given observation point Q and the sun onto the ground; and a line extending in the due south direction.

The solar altitude h and the solar azimuth angle A at a desired observation point and at a desired time can be calculated by, for example, Equations (1) to (3) below by using values appearing in Chronological Scientific Tables.

$$\cos(h)\sin(A) = -\cos(\delta)\sin(H) \quad (1)$$

$$\cos(h)\cos(A) = \cos(\varphi)\sin(\delta) - \sin(\varphi)\cos(\delta)\cos(H) \quad (2)$$

$$\sin(h) = \sin(\varphi)\sin(\delta) + \cos(\varphi)\cos(\delta)\cos(H) \quad (3)$$

In the above equations, δ is the apparent declination of the sun, H is the hour angle, and φ is the latitude of the observation point.

Assuming that a time obtained by subtracting the standard time ($9^h$ in Japan) from a time to determine the solar altitude h and the solar azimuth angle A is represented by t, the longitude of an observation point (longitude, in which east longitude is expressed by plus and west longitude is expressed by minus, is divided by 15 to yield unit of time) is represented by λ, the Greenwich apparent sidereal time of universal time $0^h$ is represented by $\theta_0$, and the apparent right ascension of the sun is represented by α, the hour angle H is expressed by Equation (4) below.

$$H = \theta_0 + t \times 1.0027379 + \lambda - \alpha \quad (4)$$

When the value of H is negative, $24^h$ is added. When the value of H exceeds $24^h$, $24^h$ is subtracted.

The apparent declination δ and the apparent right ascension α of the sun appearing in Chronological Scientific Tables are values at the universal time $0^h$. By using: the above-mentioned time t; values $\delta_0$ and $\alpha_0$ appearing in Chronological Scientific Tables as to the apparent declination δ and the apparent right ascension α of the sun on an observation day; and values $\delta_1$ and $\alpha_1$ appearing in Chronological Scientific Tables as to the apparent declination δ and the apparent right ascension α of the sun on the next day of the observation day, the apparent declination δ and the apparent right ascension α of the sun to be substituted into the above-mentioned equation can be determined by Equations (5) and (6) below.

$$\delta = (\delta_1 - \delta_0) \times t/24 + \delta_0 \quad (5)$$

$$\alpha = (\alpha_1 - \alpha_0) \times t/24 + \alpha_0 \quad (6)$$

The method for calculating the solar position described above is an example, and the calculation method that can be applied to the present embodiment is not limited thereto. In the present embodiment, any calculation method that can calculate solar positions through a whole year at predetermined time intervals by using an installation position of the communication device 1 or 2 as an observation point can be applied. For example, the solar position can be calculated without using the values appearing in Chronological Scientific Tables.

Solar positions sequentially calculated by using the installation position of the communication device 1 and the installation position of the communication device 2 as observation points can be grasped as, for example, points on two-dimensional coordinates (X axis is azimuth and Y axis is altitude) illustrated in FIG. 9. The influence determination unit 32 determines that the communication device 1 is not affected by solar light when, for example, solar positions for 365 days calculated at 15-minute intervals do not enter the range of influence R1 of the communication device 1. The influence determination unit 32 determines that the communication device 1 is affected by solar light when the solar position enters the range of influence R1 of the communication device 1. When it is determined that the communication device 1 is affected by solar light, the influence determination unit 32 recognizes, as a time zone in which the communication device 1 is affected by solar light, the range of dates and times during which the solar position enters the range of influence R1 of the communication device 1.

The influence determination unit 32 determines that the communication device 2 is not affected by solar light when, for example, solar positions for 365 days calculated at 15-minute time intervals do not enter the range of influence R2 of the communication device 2. The influence determination unit 32 determines that the communication device 2 is affected by solar light when the solar position enters the range of influence R2 of the communication device 2. When it is determined that the communication device 2 is affected by solar light, the influence determination unit 32 recognizes, as a time zone in which the communication device 2 is affected by solar light, the range of dates and times during which the solar position enters the range of influence R2 of the communication device 2.

The determination result by the influence determination unit 32 (a result of the determination on whether communication devices 1 and 2 are affected by solar light, and the time zone in a case of being affected) are transferred to the display control unit 34 together with the latitudes and longitudes of the installation positions of the communication devices 1 and 2, and the directions of the communication devices 1 and 2 (direction directed from installation position of communication device 1 toward installation position of communication device 2 and direction directed from installation position of communication device 2 toward installation position of communication device 1). The latitudes and longitudes of the installation positions of the communication devices 1 and 2 are also transferred to the distance calculation unit 33.

The distance calculation unit 33 is activated in response to the operation of the "execute" button 48 by the user. The distance calculation unit 33 then acquires the latitudes and longitudes of the installation positions of the communication devices 1 and 2 from the influence determination unit 32, and calculates a distance between the communication device 1 and the communication device 2. The distance calculation unit 33 determines whether the calculated distance between the communication device 1 and the communication device 2 falls within the range of an appropriate communication distance (for example, 20 m to 100 m) determined in advance. The distance between the communication device 1 and the communication device 2 calculated by the distance calculation unit 33 and the determination result representing whether the distance falls within the range of the appropriate communication distance are transferred to the display control unit 34.

The display control unit 34 causes the display device 14 to display, as values corresponding to items, various kinds of information acquired from the influence determination unit 32 and the distance calculation unit 33 in the result display region 44 of the UI screen 40. The value corresponding to the item "address" represents the address of the installation position of the communication device 1 (position at which marker 47 corresponding to communication device 1 is superimposed), which is included in, for example, map data acquired from a predetermined map providing site. The value of an indication of RSSI in the item "communication distance" represents the value of RSSI corresponding to a distance section to which the distance between the communication device 1 and the communication device 2 acquired from the distance calculation unit 33 belongs, which is obtained in a manner that the above-mentioned range of the appropriate communication distance is sectioned into a plurality of distance ranges and the assumed value of RSSI is determined in advance for each distance section and is selected from the values of RSSI determined for the distance sections.

In the example of the UI screen 40 illustrated in FIG. 4, the distance between the communication device 1 and the communication device 2 calculated by the distance calculation unit 33 is 23.654 m, which falls within the range of the appropriate communication distance. Thus, "23.654 m" and "OK" are displayed as the inter-communication device value and the value of the determination in the item "communication distance", respectively. As the value of the indication of RSSI, "3.85 v or more" is displayed, which is determined in advance as a value corresponding to a distance section to which 23.654 m belongs. By referring to this display in the UI screen 40, the user can recognize that communication can be appropriately performed between the communication devices 1 and 2 located at the installation positions of the communication devices 1 and 2 that have been designated on the map in the map display region 41. The value of the indication of RSSI can be used for the alignment of optical axes when the communication devices 1 and 2 are actually installed at the installation positions of the communication devices 1 and 2 designated on the map in the map display region 41. In other words, when the value of the indication of RSSI is "3.85 v or more", the optical axes of the communication devices 1 and 2 can be efficiently aligned by adjusting the relative directions of the communication devices 1 and 2 such that RSSI of 3.85 v or more is obtained at both of the communication devices 1 and 2.

In the example of the UI screen 40 illustrated in FIG. 4, it is determined, by the influence determination unit 32, that both of the communication devices 1 and 2 are affected by solar light. Thus, time zones in which the communication device 1 and the communication device 2 are affected by solar light are displayed as both of the value of the communication device 1 and the value of the communication device 2 in the item "influence date and time". Specifically, it is indicated that the communication device 1 is affected by solar light from 5:45 to 6:45 in the morning in the period from February 24 to April 5 and is affected by solar light from 5:30 to 6:15 in the morning in the period from September 8 to October 20. Further, it is indicated that the communication device 2 is affected by solar light from 17:30 to 18:15 in the evening in the period from March 14 to April 26 and is affected by solar light from 17:15 to 18:15 in the evening in the period from August 16 to September 30.

By referring to the above display in the UI screen 40, the user can recognize that the communication device 1 and the communication device 2 are affected by solar light in the morning and in the evening, respectively, at the installation positions of the communication devices 1 and 2 that have been designated on the map in the map display region 41. Then, the user can determine that there is no problem even when the communication devices 1 and 2 are installed at the installation positions designated on the map in the map display region 41 unless the communication devices 1 and 2 communicate in the time zones in which the communication devices 1 and 2 are affected by solar light. The user can also determine that the installation positions of the communication devices 1 and 2 need to be reconsidered when the communication devices 1 and 2 communicate in the time zones in which the communication devices 1 and 2 are affected by solar light. When it is determined that the installation positions of the communication devices 1 and 2 need to be reconsidered, the user can operate the "delete" button 49 disposed in the button arrangement region 42 on the UI screen 40 to delete the markers 47 on the map, and can newly designate installation positions of the communication devices 1 and 2 on the map. The user may newly designate the installation positions of the communication devices 1 and 2 on the map by moving the positions of the markers 47 on the map by drag and drop operation without operating the "delete button" 49.

Figure 10:
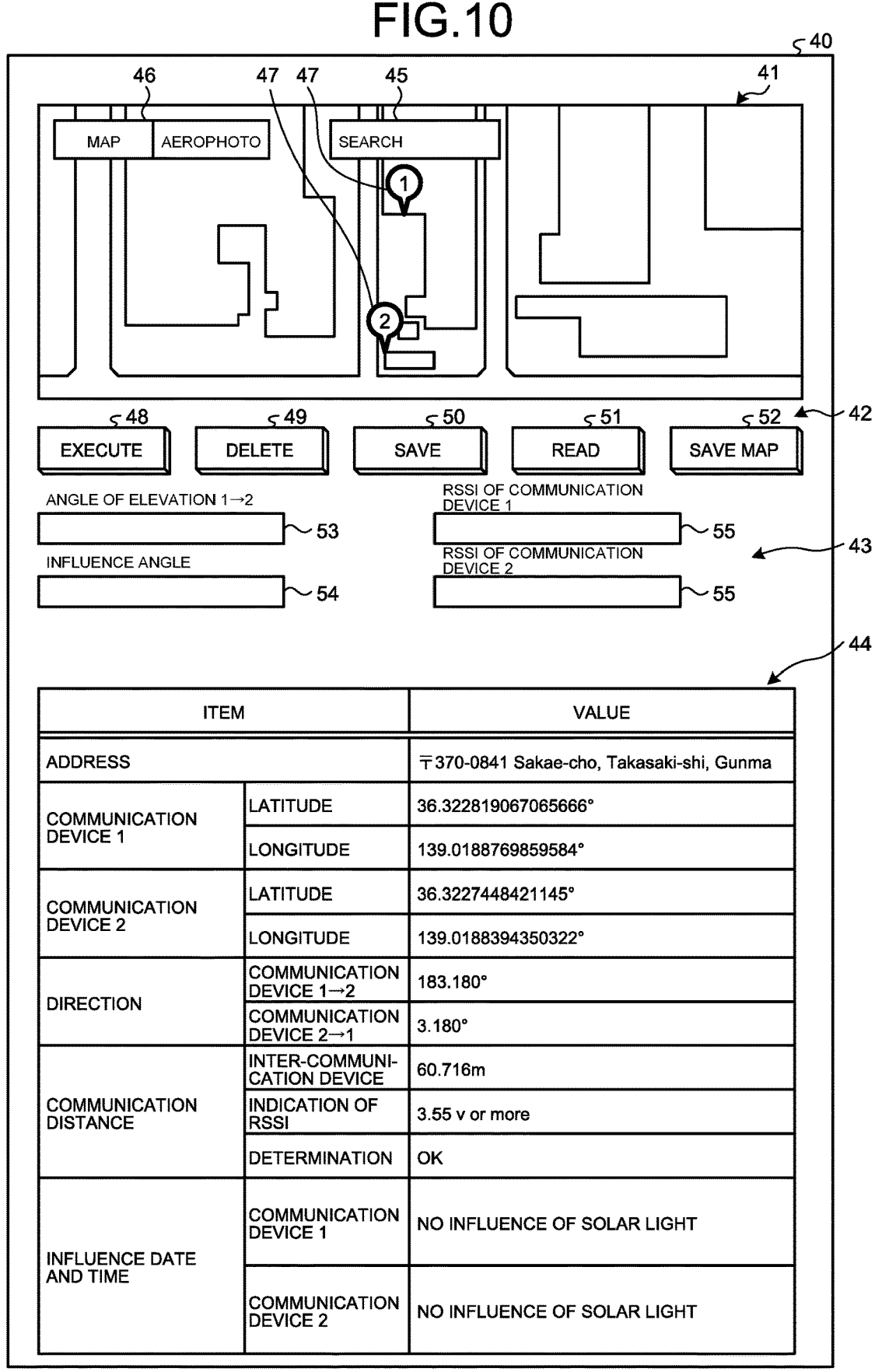
FIG. 10 is a diagram illustrating an example of a UI screen.

FIG. 10 illustrates an example of the UI screen 40 when the user operates the "delete" button 49 on the UI screen 40 illustrated in FIG. 4 to delete the markers 47 on the map, newly designates the installation positions of the communication devices 1 and 2 after reducing the map, and operates the "execute" button 48. In this case, the values of the angle of elevation and the influence angle are not changed from those input on the UI screen 40 illustrated in FIG. 4, and the values are maintained.

In the example of the UI screen 40 illustrated in FIG. 10, the distance between the communication device 1 and the communication device 2 calculated by the distance calculation unit 33 is 60.716 m, which falls within the range of the appropriate communication distance. Thus, "60.716 m" and "OK" are displayed as the inter-communication device value and the value of the determination in the item "communication distance", respectively. As the value of the indication of RSSI, "3.55 v or more" is displayed, which is determined in advance as a value corresponding to a distance section to which 60.716 m belongs. By referring to this display, the user can recognize that when RSSI of 3.55 v or more is obtained, communication can be performed between the communication devices 1 and 2 that are located at the installation positions of the communication devices 1 and 2 newly designated on the map in the map display region 41.

In the example of the UI screen 40 illustrated in FIG. 10, it is determined by the influence determination unit 32 that neither of the communication devices 1 and 2 is affected by solar light, and hence a message that "there is no influence of solar light" is displayed as both of the value of the communication device 1 and the value of the communication device 2 in the item "influence date and time". By referring to this display, the user can determine that when the communication devices 1 and 2 are located at the installation positions newly designated on the map in the map display region 41, the communication devices 1 and 2 can appropriately communicate without being affected by solar light, and there is no problem if the communication devices 1 and 2 are installed at the installation positions newly designated on the map in the map display region 41.

The UI screens 40 exemplified in FIG. 4 and FIG. 10 are examples, and the configuration of the UI screen 40 may be changed as appropriate. For example, in the UI screens 40 exemplified in FIG. 4 and FIG. 10, the address of the center of the map, the latitudes and longitudes and the directions of the installation positions of the communication devices 1 and 2 are displayed in the result display region 44, but these pieces of information may be held inside and are not necessarily required to be displayed in the result display region 44. In the UI screens 40 exemplified in FIG. 4 and FIG. 10, the "RSSI" input box 55 is provided in the user input region 43, but the "RSSI" input box 55 is not necessarily required to be provided in the user input region 43 because the "RSSI" input box 55 is used to input measured values obtained when RSSI is actually measured for both of the communication devices 1 and 2 after the installation of the communication devices 1 and 2 is completed, and the usefulness in considering the installation positions of the communication devices 1 and 2 is low.

The saving unit 35 is activated in response to the operation of the "save" button 50 by the user, and saves various kinds of information displayed in the result display region 44 of the UI screen 40 at the time at which the "save" button 50 is operated, for example, in the csv file format. In this case, in the case where measured values of RSSI of the communication devices 1 and 2 have been input in the "RSSI" input box 55 in the user input region 43, the measured values of RSSI of the communication devices 1 and 2 are saved as well. The saving unit 35 is activated in response to the operation of the "map save" button 52 by the user, and saves a map displayed in the map display region 41 of the UI screen 40 at the time at which the "map save" button 52 is operated. The destination to save the various kinds of information and the map may be inside or outside the installation assist apparatus 10.

The reading unit 36 is activated in response to the operation of the "read" button 51 by the user, and reads information and a map selected by the user from among various kinds of information and maps saved in a predetermined save destination by the saving unit 35, and displays the read information and map in the result display region 44 and the map display region 41. In other words, when the "read" button 51 is operated by the user, first, the reading unit 36 displays a list of various kinds of information and maps saved as data files in the predetermined save destination on the UI screen 40. When a desired file is selected by the user from the list, the reading unit 36 reads and expands the selected file from the save destination, displays various kinds of information in the result display region 44, and displays the map in the map display region 41. In the case where measured values of RSSI of the communication devices 1 and 2 have been saved in the selected file, the measured values of RSSI of the communication devices 1 and 2 are also displayed.

The installation assist apparatus 10 in the present embodiment, which is provided with the saving unit 35 and the reading unit 36, can preserve and reproduce past arithmetic operation results corresponding to user's operation as logs. When the user inputs measured values of RSSI of the communication devices 1 and 2 in the "RSSI" input box 55 after the installation of the communication devices 1 and 2 is completed, and operates the "save" button 50, the measured values of RSSI can be preserved as the past results of the installation work of the communication devices 1 and 2.

Figure 11:
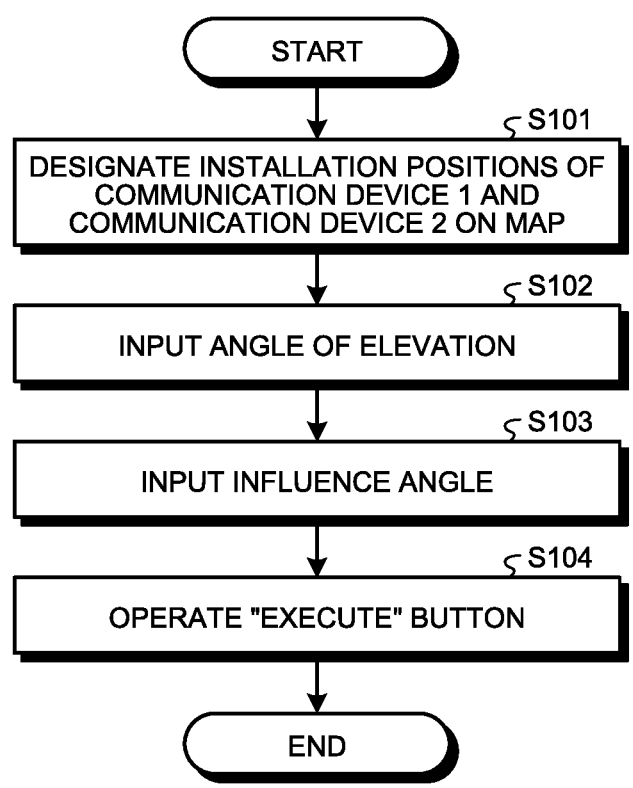
FIG. 11 is a flowchart for describing a processing procedure for a user.

Next, the operation of the installation assist apparatus 10 in the present embodiment configured as described above will be described. First, with reference to FIG. 11, operation performed on the installation assist apparatus 10 by the user to consider installation positions of the communication devices 1 and 2 will be described. FIG. 11 is a flowchart for describing an operation procedure for the user using the UI screen 40.

When the installation assist apparatus 10 in the present embodiment starts to operate, the UI screen 40 is displayed on the display device 14. The user operates the installation assist apparatus 10 to display a desired map in the map display region 41 on the UI screen 40. Then, the user designates installation positions of the communication device 1 and the communication device 2 to be installed on the map (Step S101).

Next, the user inputs a desired angle of elevation in the "angle of elevation" input box 53 provided in the user input region 43 on the UI screen 40 (Step S102), and inputs an influence angle depending on the structure of the communication devices 1 and 2 in the "influence angle" input box 54 (Step S103). The user operates the "execute" button 48 disposed in the button arrangement region 42 on the UI screen 40 (Step S104).

The operations of the user using the UI screen 40 are received by the input reception unit 31. When the operation of the "execute" button 48 is received by the input reception unit 31, the influence determination unit 32 and the distance calculation unit 33 are activated, and various kinds of arithmetic operations are performed by the influence determination unit 32 and the distance calculation unit 33.

Figure 12:
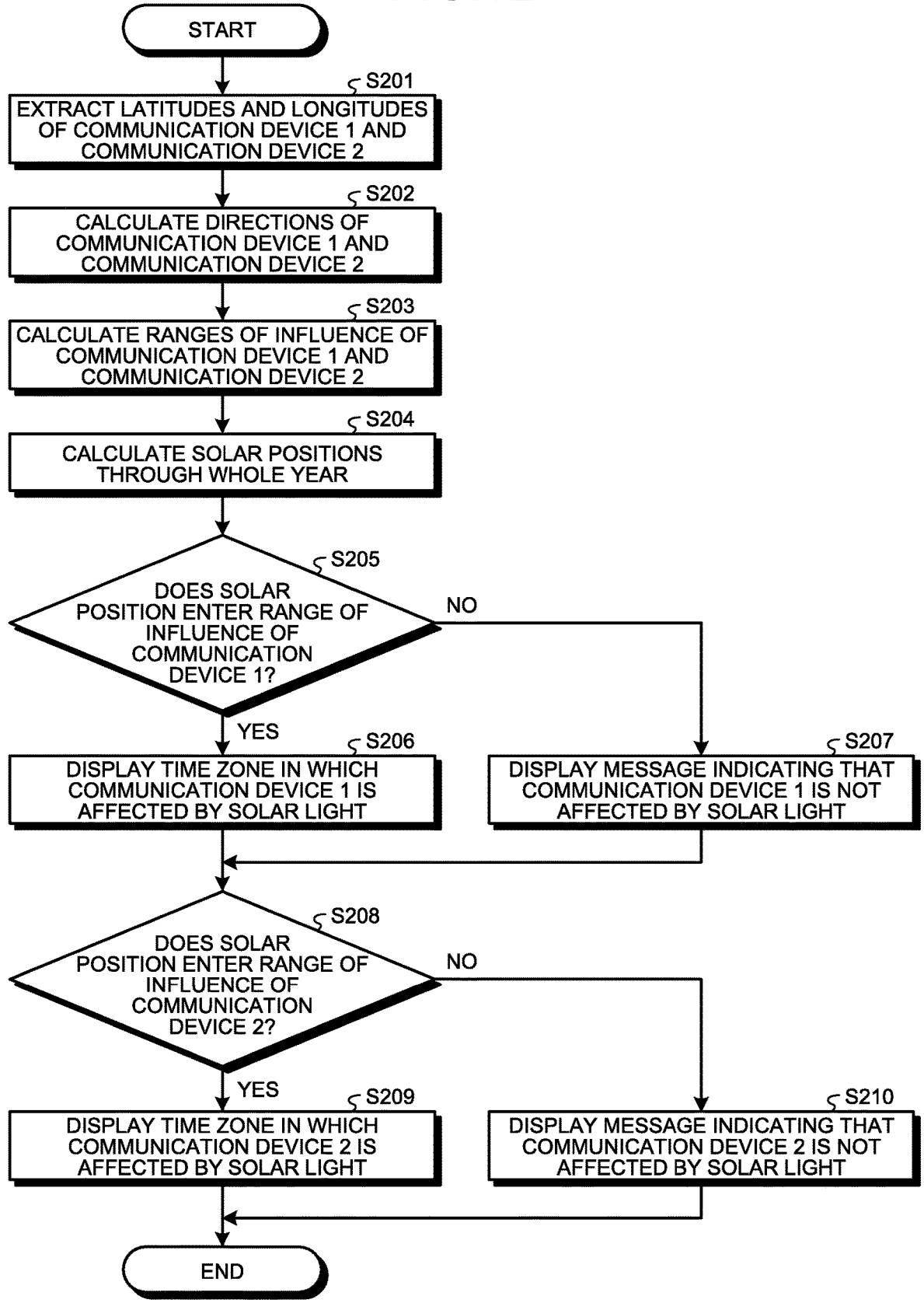
FIG. 12 is a flowchart for describing a processing procedure of an influence determination unit and a display control unit.

Next, with reference to FIG. 12, operations of the influence determination unit 32 and the display control unit 34 after the "execute" button 48 is operated are described. FIG. 12 is a flowchart for describing a processing procedure of the influence determination unit 32 and the display control unit 34.

When the influence determination unit 32 is activated in response to the operation of the "execute" button 48, the influence determination unit 32 extracts the latitudes and longitudes of the communication device 1 and the communication device 2 whose installation positions have been designated on the map (Step S201). The influence determination unit 32 calculates directions of the communication device 1 and the communication device 2 based on the latitudes and longitudes of the communication device 1 and the communication device 2 (Step S202). The direction of the communication device 1 is a direction directed from the installation position of the communication device 1 toward the installation position of the communication device 2, and this direction is represented by an azimuth of the communication device 2 (for example, the angle θ3 shown in FIG. 7). The direction of the communication device 2 is a direction directed from the installation position of the communication device 1 toward the installation position of the communication device 2, and this direction is represented by an azimuth of the communication device 1 (for example, the angle θ4 shown in FIG. 7).

Next, the influence determination unit 32 calculates the ranges of influence R1 and R2 of the communication device 1 and the communication device 2 based on the directions of the communication device 1 and the communication device 2 calculated at Step S202, the angle of elevation input by the user, and the influence angle input by the user (Step S203). The influence determination unit 32 calculates solar positions through a whole year using the installation position of the communication device 1 as an observation point, and solar positions through a whole year using the installation position of the communication device 2 as an observation point (Step S204).

Regarding the solar positions through a whole year, the above-mentioned solar altitude h and solar azimuth angle A at the installation positions of the communication devices 1 and 2 as observation points are calculated for 365 days at predetermined intervals, such as 15-minute intervals. In other words, the above-mentioned solar altitude h and solar azimuth angle A at the installation positions of the communication devices 1 and 2 as observation points are sequentially calculated from 0:00 on January 1 until 23:45 on December 31. In a case where the time zones from sunset to sunrise have been known, the calculation of solar positions in the time zones may be skipped.

Next, the influence determination unit 32 checks whether the solar position calculated at Step S204 enters the range of influence R1 of the communication device 1 calculated at Step S203 (Step S205). When the solar position enters the range of influence R1 of the communication device 1 (Yes at Step S205), the influence determination unit 32 determines that the communication device 1 is affected by solar light, and transfers, to the display control unit 34, the determination result representing that the communication device 1 is affected by solar light and the time zone in which the communication device 1 is affected by solar light (range of dates and times in which solar position enters range of influence R1 of communication device 1). In this case, the display control unit 34 displays the time zone in which the communication device 1 is affected by solar light as the value of the communication device 1 in the item "influence date and time" in the result display region 44 on the UI screen 40 (Step S206).

On the other hand, when the solar position does not enter the range of influence R1 of the communication device 1 (No at Step S205), the influence determination unit 32 determines that the communication device 1 is not affected by solar light, and transfers, to the display control unit 34, the determination result representing that the communication device 1 is not affected by solar light. In this case, the display control unit 34 displays a message representing that the communication device 1 is not affected by solar light, for example, a message that "there is no influence of solar light" as the value of the communication device 1 in the item "influence date and time" in the result display region 44 on the UI screen 40 (Step S207).

Similarly, the influence determination unit 32 checks whether the solar position calculated at Step S204 enters the range of influence R2 of the communication device 2 calculated at Step S203 (Step S208). When the solar position enters the range of influence R2 of the communication device 2 (Yes at Step S208), the influence determination unit 32 determines that the communication device 2 is affected by solar light, and transfers, to the display control unit 34, the determination result representing that the communication device 2 is affected by solar light and the time zone in which the communication device 2 is affected by solar light (range of dates and times in which solar position enters range of influence R2 of communication device 2). In this case, the display control unit 34 displays the time zone in which the communication device 2 is affected by solar light as the value of the communication device 2 in the item "influence date and time" in the result display region 44 on the UI screen 40 (Step S209).

On the other hand, when the solar position does not enter the range of influence R2 of the communication device 2 (No at Step S208), the influence determination unit 32 determines that the communication device 2 is not affected by solar light, and transfers, to the display control unit 34, the determination result representing that the communication device 2 is not affected by solar light. In this case, the display control unit 34 displays a message representing that the communication device 2 is not affected by solar light, for example, a message that "there is no influence of solar light" as the value of the communication device 2 in the item "influence date and time" in the result display region 44 on the UI screen 40 (Step S210).

Figure 13:
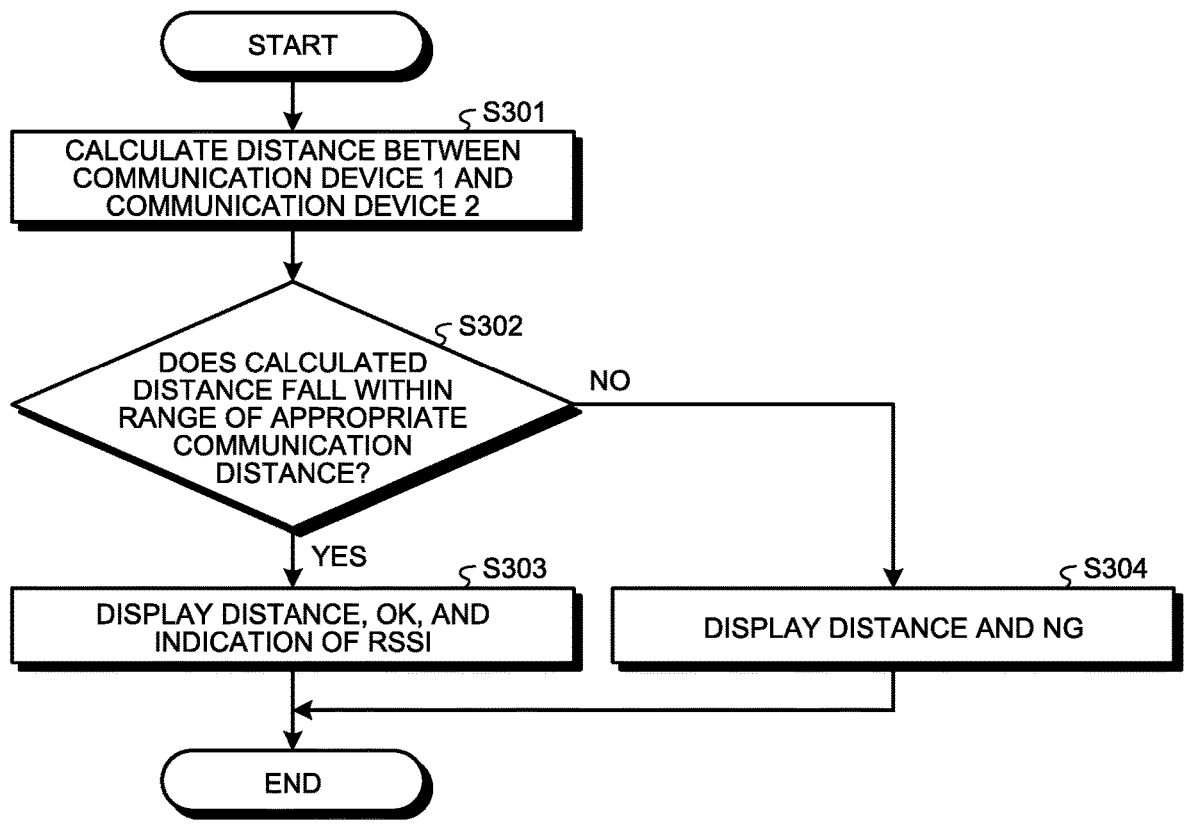
FIG. 13 is a flowchart for describing a processing procedure of a distance calculation unit and the display control unit.
Figure 14:
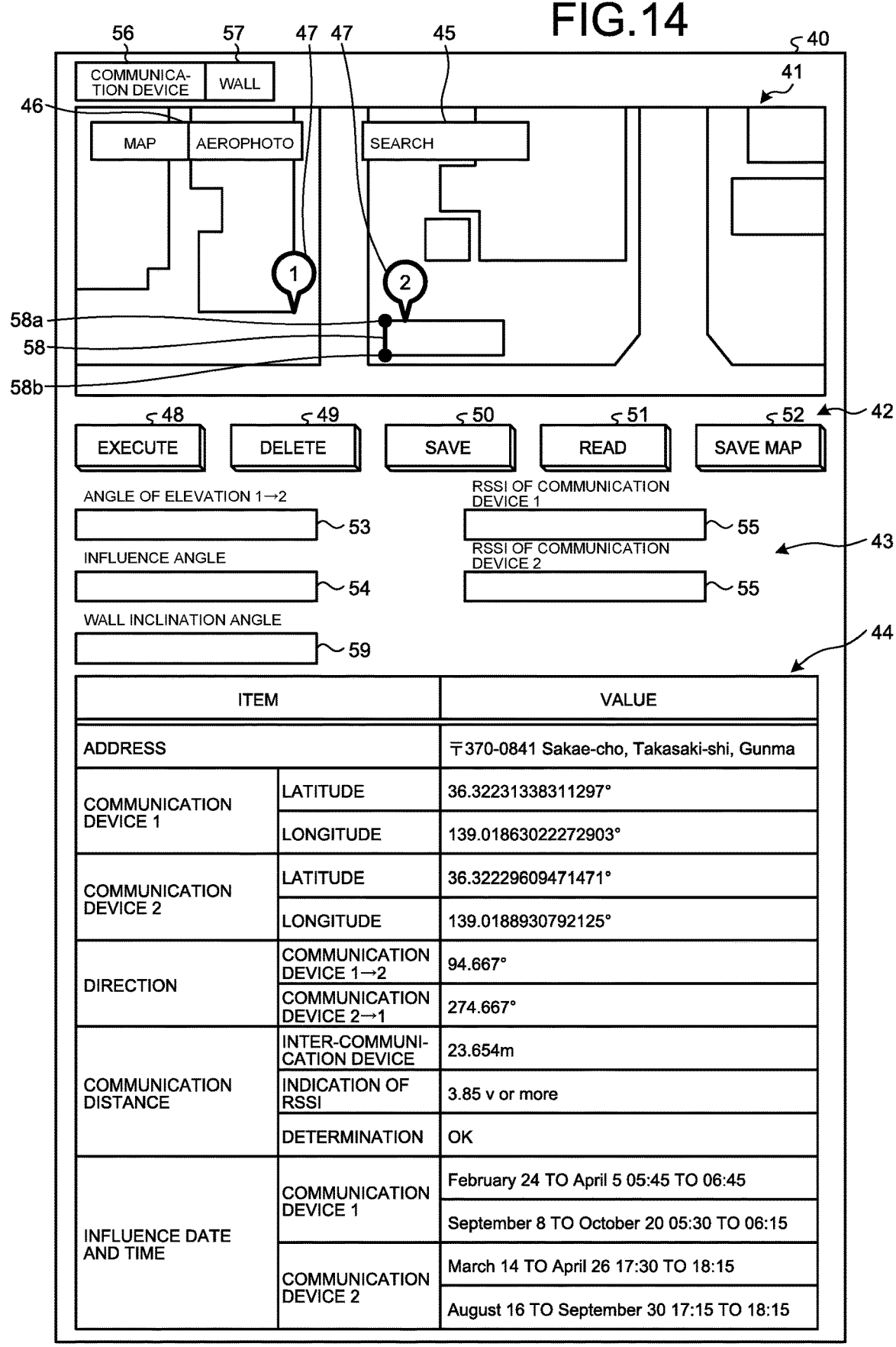
FIG. 14 is a diagram illustrating an example of a UI screen in a modification.

Next, with reference to FIG. 13, operations of the distance calculation unit 33 and the display control unit 34 after the "execute" button 48 is operated will be described. FIG. 13 is a flowchart for describing a processing procedure of the distance calculation unit 33 and the display control unit 34.

When the distance calculation unit 33 is activated in response to the operation of the "execute" button 48, the distance calculation unit 33 acquires the latitudes and longitudes of the communication device 1 and the communication device 2 whose installation positions have been designated on the map from the influence determination unit 32, and calculates a distance between the communication device 1 and the communication device 2 (Step S301). In this case, when the angle of elevation input by the user exceeds a predetermined value, the distance calculation unit 33 may more accurately calculate the distance between the communication device 1 and the communication device 2 in consideration of the value of the angle of elevation.

Next, the distance calculation unit 33 determines whether the distance calculated at Step S301 falls within the range of an appropriate communication distance determined in advance (Step S302). When the distance calculated at Step S301 falls within the range of the appropriate communication distance (Yes at Step S302), the distance calculation unit 33 transfers the distance calculated at Step S301 and the determination result of OK to the display control unit 34. In this case, the display control unit 34 displays the distance calculated at Step S301, "OK", and the value of RSSI corresponding to a distance section to which the distance calculated at Step S301 belongs as the inter-communication device value, the value of the determination, and the value of the indication of RSSI, respectively, in the item "communication distance" in the result display region 44 on the UI screen 40 (Step S303).

On the other hand, when the distance calculated at Step S301 is out of the range of the appropriate communication distance (No at Step S302), the distance calculation unit 33 transfers the distance calculated at Step S301 and the determination result of NG to the display control unit 34. In this case, the display control unit 34 displays the distance calculated at Step S301 and "NG" as the inter-communication device value and the value of the determination, respectively, in the item "communication distance" in the result display region 44 on the UI screen 40 (Step S304).

As described above in detail by way of specific examples, the installation assist apparatus 10 in the present embodiment is configured to: receive an input of installation positions of a communication device 1 and a communication device 2, which are a pair of optical wireless communication devices to be installed, an input of an angle of elevation, and an input of an influence angle; determine whether the communication devices 1 and 2 are affected by solar light based on the installation positions of the communication devices 1 and 2, the angle of elevation, the influence angle, and solar positions through a whole year; and display the determination results. Thus, by employing the installation assist apparatus 10 in the present embodiment, the user is able to quantitatively determine the influence of solar light when installing the optical wireless communication devices, and consider the appropriate installation positions of the communication devices 1 and 2 in consideration of the influence of solar light.

When it is determined that the communication devices 1 and 2 are affected by solar light, the installation assist apparatus 10 in the present embodiment causes the display device 14 to display a time zone in which the communication devices 1 and 2 are affected by solar light. Thus, the user is able to determine whether a problem occurs when the communication devices 1 and 2 are affected by solar light depending on whether the communication devices 1 and 2 communicate in the time zone.

The installation assist apparatus 10 in the present embodiment enables the installation positions of the communication devices 1 and 2 to be input by the designation of positions on a map. Thus, the user is able to intuitively input the installation positions of the communication devices 1 and 2.

The installation assist apparatus 10 in the present embodiment calculates a distance between the communication device 1 and the communication device 2 based on the input installation positions of the communication devices 1 and 2, and further displays the calculated distance and a determination result representing whether the distance falls within the range of an appropriate communication distance determined in advance. Thus, the user is able to recognize in advance whether the communication devices 1 and 2 can appropriately communicate when the communication devices 1 and 2 are actually installed at the input installation positions.

The installation assist apparatus 10 in the present embodiment saves, as data files, various kinds of information (result information) including the determination results of the influence of solar light, and reads and displays the saved files as appropriate. Thus, the past arithmetic operation results corresponding to user's operation can be preserved or reproduced as logs.

Modification

In the above-mentioned embodiment, the determination on whether the communication devices 1 and 2 are affected by solar light is performed based on whether solar positions enter the ranges of influence R1 and R2 of the communication devices 1 and 2. Alternatively, the determination on whether the communication devices 1 and 2 are affected by solar light may be determined further in consideration of reflection light from structure such as a wall around the installation positions of the communication devices 1 and 2.

mFIG. 14 is a diagram illustrating an example of a UI screen 40 in the present modification. In the present modification, a "communication device" button 56 to be operated to designate installation positions of the communication devices 1 and 2 on a map displayed in a map display region 41 and a "wall" button 57 to be operated to designate the position of a structure such as a wall are added near the map display region 41 of the UI screen 40. A "wall inclination angle" input box 59 to input the inclination angle of structure such as a wall is added in a user input region 43 of the UI screen 40.

In the present modification, when designating the installation positions of the communication devices 1 and 2 on a map displayed in the map display region 41, a user operates the "communication device" button 56 by tap operation, and then sequentially designates positions to install the communication devices 1 and 2 by tap operation on the map displayed in the map display region 41. When designating the position of structure such as a wall on the map displayed in the map display region 41, the user operates the "wall" button 57 by tap operation, and then sequentially designates the positions of both end portions of structure such as a wall by tap operation on the map displayed in the map display region 41. Pointers 58a and 58b are superimposed at the positions of both end portions of the structure such as a wall designated on the map, and a straight line connecting the pointers 58a and 58b is displayed as a wall position 58 in an emphasized manner.

Figure 15:
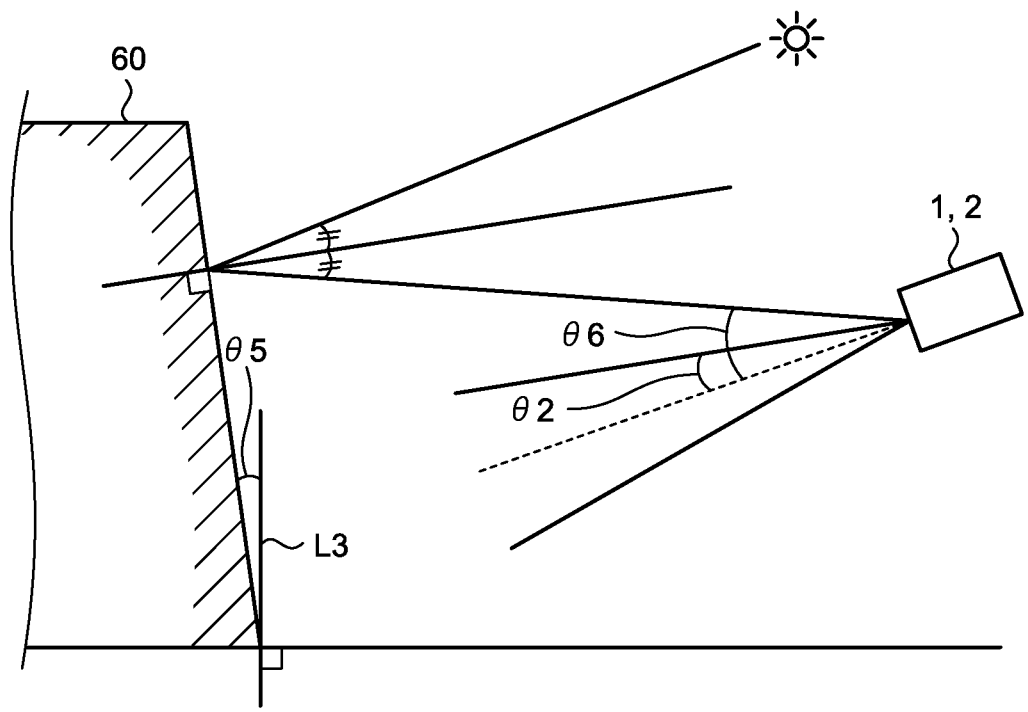
FIG. 15 is a diagram for describing the influence of reflection light from a structure.

When the position of the structure such as a wall is designated on the map displayed in the map display region 41, the user can further input an inclination angle of the structure, such as a wall, in the "wall inclination angle" input box 59 provided in the user input region 43. For example, as illustrated in FIG. 15, the inclination angle is an angle representing an inclination θ5 of a side surface (reflection surface) of a structure 60 to a perpendicular line L3 which is perpendicular to the ground.

In the present modification, when the user inputs the position and the inclination angle of the structure 60, the inputs are further received by the input reception unit 31. The influence determination unit 32 determines the presence/absence of the influence of reflection light (specular light) from the structure 60 in addition to the above-mentioned determination on the presence/absence of the influence of solar light based on solar positions. Specifically, as illustrated in FIG. 15, the influence determination unit 32 calculates, based on the installation positions of the communication devices 1 and 2 and the position and the inclination angle θ5 of the structure 60, for each of solar positions sequentially calculated through a whole year, an incident angle θ6 of solar light that enters the communication devices 1 and 2 after being regularly reflected by the side surface (reflection surface) of the structure 60. When the incident angle θ6 of solar light regularly reflected by the side surface (reflection surface) of the structure 60 becomes equal to or smaller than the influence angle θ2 of the communication devices 1 and 2, it is determined that the communication devices 1 and 2 are affected by solar light even in the case where the solar positions do not enter the ranges of influence R1 and R2 of the communication devices 1 and 2.

As described above, according to the present modification, the determination on whether the communication devices 1 and 2 are affected by solar light can be determined in consideration of reflection light from structure such as a wall around the installation positions of the communication devices 1 and 2. Thus, the presence/absence of the influence of solar light can be determined more accurately than in the above-mentioned embodiment.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An installation assist apparatus comprising:
a memory; and
a hardware processor coupled to the memory and configured to:
receive: an input of installation positions of a first optical wireless communication device and a second optical wireless communication device that perform optical wireless communication; and an input of an angle of elevation representing an inclination of an optical axis center line to a horizontal line, the optical axis center line connecting the first and second optical wireless communication devices;
determine whether each of the first and second optical wireless communication devices is affected by solar light, the determination being carried out based on the installation positions of the first and second optical wireless communication devices, the angle of elevation, an influence angle representing a maximum value of an incident angle of solar light affecting the optical wireless communication devices, and solar positions through a whole year; and
cause a display device to display a result of the determination on whether each of the first and second optical wireless communication devices is affected by solar light,
wherein the hardware processor receives an input of the influence angle and carries out the determination by using the input influence angle.

2. The installation assist apparatus according to claim 1, wherein, when it is determined that the first optical wireless communication device or the second optical wireless communication device is affected by solar light, the hardware processor causes the display device to display a time zone in which a determined one of the first and second optical wireless communication devices is affected by solar light.

3. The installation assist apparatus according to claim 1, wherein the input of the installation positions of the first and second optical wireless communication devices is carries out by designating the installation positions on a map displayed on the display device.

4. The installation assist apparatus according to claim 1, wherein the hardware processor:
calculates a distance between the first and second optical wireless communication devices based on the installation positions of the first and second optical wireless communication devices;
determines whether the calculated distance falls within a range of an appropriate communication distance determined in advance; and
cause the display device to display the calculated distance and a result of the determination on whether the calculated distance falls within the range of the appropriate communication distance.

5. The installation assist apparatus according to claim 1, wherein the hardware processor causes the display device to display: position information representing the installation positions of the first and second optical wireless communication devices; and a direction indicated by the optical axis center line connecting the first and second optical wireless communication devices.

6. The installation assist apparatus according to claim 1, wherein the hardware processor:
receives an input of a position of a reflection surface reflecting solar light around the first and second optical wireless communication devices, and an input of an inclination of the reflection surface to a direction perpendicular to a ground; and
carries out the determination on whether each of the first and second optical wireless communication devices is affected by solar light, based further on the position of the reflection surface and the inclination.

7. The installation assist apparatus according to claim 1, wherein the hardware processor:
saves, as a data file, result information including the result of the determination; and
reads the saved data file and causes the display device to display the result information.

8. An installation assist method implemented by a computer, the method comprising:
receiving: an input of installation positions of a first optical wireless communication device and a second optical wireless communication device that perform optical wireless communication; and an input of an angle of elevation representing an inclination of an optical axis center line to a horizontal line, the optical axis center line connecting the first and second optical wireless communication devices;

determining whether each of the first and second optical wireless communication devices is affected by solar light, the determination being carried out based on the installation positions of the first and second optical wireless communication devices, the angle of elevation, an influence angle representing a maximum value of an incident angle of solar light affecting the optical wireless communication devices, and solar positions through a whole year; and causing a display device to display a result of the determination on whether each of the first and second optical wireless communication devices is affected by solar light, wherein the method includes receiving an input of the influence angle and carrying out the determination by using the input influence angle.

9. A computer program product comprising a non-transitory computer-readable recording medium on which an executable program is recorded, the program instructing a computer to:

receive: an input of installation positions of a first optical wireless communication device and a second optical wireless communication device that perform optical wireless communication; and an input of an angle of elevation representing an inclination of an optical axis center line to a horizontal line, the optical axis center line connecting the first and second optical wireless communication devices;

determine whether each of the first and second optical wireless communication devices is affected by solar light, the determination being carried out based on the installation positions of the first and second optical wireless communication devices, the angle of elevation, an influence angle representing a maximum value of an incident angle of solar light affecting the optical wireless communication devices, and solar positions through a whole year; and cause a display device to display a result of the determination on whether each of the first and second optical wireless communication devices is affected by solar light, wherein the program further instructs the computer to receive an input of the influence angle and carry out the determination by using the input influence angle.

* * * * *